United States Patent
Evans et al.

(10) Patent No.: US 8,634,718 B2
(45) Date of Patent: Jan. 21, 2014

(54) POLARIZATION CONTROL IN A PHOTONIC INTEGRATED CIRCUIT

(75) Inventors: Peter W. Evans, Mountain House, CA (US); Pavel V. Studenkov, Cupertino, CA (US); Matthew Fisher, Mountain View, CA (US); Charles H. Joyner, Haleiwa, HI (US)

(73) Assignee: Infinera Corporation, Sunnyvale, CA (US)

( * ) Notice: Subject to any disclaimer, the term of this patent is extended or adjusted under 35 U.S.C. 154(b) by 507 days.

(21) Appl. No.: 12/790,779

(22) Filed: May 28, 2010

(65) Prior Publication Data

US 2011/0293275 A1    Dec. 1, 2011

(51) Int. Cl.
*H04J 14/02* (2006.01)

(52) U.S. Cl.
USPC .......... 398/82; 398/152; 398/156; 385/11; 385/24

(58) Field of Classification Search
USPC ............ 398/141–150, 152, 156, 82; 385/11, 385/15–52
See application file for complete search history.

(56) References Cited

U.S. PATENT DOCUMENTS 5,644,397 A * 7/1997 Blake ........................... 356/483
7,236,654 B1 * 6/2007 Bramson et al. ................ 385/3

* cited by examiner

*Primary Examiner* — Leslie Pascal
(74) *Attorney, Agent, or Firm* — David L. Soltz

(57) ABSTRACT

The present invention provides a system, apparatus and method to maintain the polarization state of an optical signal propagating within a photonic integrated circuit, or from a first photonic integrated circuit to a second photonic integrated circuit. According to various embodiments of the invention, an optical circuit is provided which includes an optical coupler configured to accept a first optical signal on a first input and a second optical signal on a second input, the second optical signal having a polarization state. The optical coupler may combine the first and second optical signals into an optical output signal. A principle axis of a first end of an optical fiber is may be configured to align with the polarization state of the second optical signal, such that a polarization maintaining connection is established. The polarization state may be a TM polarization state, a TE polarization state, or another polarization state. The optical circuit may include birefringent structures, such as birefringent waveguides and birefringent wavelength selective couplers, to further maintain the polarization of optical signals propagating through the photonic integrated circuits.

23 Claims, 8 Drawing Sheets

POLARIZATION CONTROL IN A PHOTONIC INTEGRATED CIRCUIT

BACKGROUND OF THE INVENTION

1. Field of the Invention

This invention relates generally to optical transmission systems and, more particularly, to polarization multiplexed optical transmission systems.

2. Description of the Related Art

In optical polarization multiplexed transmission systems, two optical signals each having a common wavelength, but one of two orthogonal polarizations, may be independently modulated, and then multiplexed together for transmission over a network infrastructure, over a fiber optical cable, for example. Due to their mutual orthogonality, the optical signals can be differentiated from each other at an optical receiver, located at a terminal node where a client signal interfaces to a network infrastructure, for example. Polarization multiplexing, therefore, potentially doubles the transmission capacity for each wavelength channel.

One requirement for polarization demultiplexing the two optical signals, with acceptable tolerance to noise, is for the two polarizations of the two optical signals to be perfectly orthogonal at the point of multiplexing, for example in an optical transmitter. If the two polarizations are not orthogonal, then a portion of each of the two optical signals will overlap in both frequency and polarization, and may not be distinguished from each other at the receiver or terminal point. The intermixing of one optical signal on top of a second leads to noise on the second channel, and hence data bit errors. The polarization states associated with optical signals propagating in a transmission system are preferably well maintained from the point of origin, e.g. an output of a light source, through one or more optical elements, to a polarization beam combiner. Such one or more optical elements may include, but are not limited to, modulation elements, wavelength multiplexing elements, as well as passive elements such as the various waveguide structures which transport the optical signals from one element to another, as part of a photonic integrated circuit (PIC) for example. However, waveguide attributes such as waveguide imperfections and deviations in the fabrication process which may impart some randomness in the fabrication structure, waveguide surface roughness scattering, waveguide junctions, and waveguide bends may serve to re-orient the polarization state as the optical signal propagates in a photonic integrated circuit (PIC).

There is a need to maintain, or mitigate changes in, the polarization state of an optical signal propagating in a photonic integrated circuit. Further, there is a need to maintain, or mitigate changes in, the polarization state of an optical signal propagating from one photonic integrated circuit to another photonic integrated circuit.

SUMMARY OF THE INVENTION

The present invention provides a system, apparatus and method to maintain the polarization state of an optical signal propagating within a photonic integrated circuit, or from a first photonic integrated circuit to a second photonic integrated circuit. According to various embodiments of the invention, an optical circuit is provided which includes an optical coupler configured to accept a first optical signal on a first input and a second optical signal on a second input, the second optical signal having a polarization state. The optical coupler combines the first and second optical signal into an optical output signal. A principle axis of a first end of an optical fiber is configured to align with the polarization state of the second optical signal. In a first aspect of the present invention the first optical signal is a first of a plurality of first optical signals, such as a WDM signal for example. Each of the plurality of first optical signals may include s corresponding one of a plurality of first wavelengths and the second optical signal including a second wavelength, the second wavelength being different than each of the plurality of first wavelengths. In other aspects of the present invention the polarization state is a TM polarization state or a TE polarization state, or another polarization state.

According to other various embodiments of the invention an optical circuit is provided which includes a plurality of signal channels configured to receive data and provide a corresponding one of a plurality of first modulated outputs and a corresponding one of a plurality of second modulated outputs in response to the received data. The optical circuit may include pluralities of first and second waveguides each having inputs and outputs, each of the first waveguides may be configured to receive a corresponding one of the plurality of first modulated outputs and each of the second waveguides may be configured to receive a corresponding one of the plurality of second modulated outputs. The optical circuit may further include first and second multiplexers each having a plurality of inputs and an output. The output of each of the plurality of first waveguides may be coupled to a corresponding one of the plurality of inputs of the first multiplexer, such that the first multiplexer combines the first modulated output from each of the plurality of signal channels into a first multiplexed output provided at the output of the first multiplexer. The output of each of the plurality of second waveguides may be coupled to a corresponding one of the plurality of inputs of the second multiplexer, such that the second multiplexer combines the second modulated output from each of the plurality of signal channels into a second multiplexed output provided at the output of the second multiplexer. The optical circuit may include third and fourth waveguides, the third coupled to receive the first multiplexed output and the fourth waveguide coupled to receive the second multiplexed output. In certain aspects of the invention the optical circuit includes a light source configured to provide an alignment optical signal on a fifth waveguide. The optical circuit may further include an optical combiner having first and second inputs and an output, the first multiplexed output provided to the first input and the alignment optical signal provided to the second input. According to certain aspects of the invention, the optical combiner is configured to combine the first multiplexed output with the alignment optical signal and provide a output optical signal at the output of the combiner. In other aspects of the present invention, one or more of the optical waveguides are birefringent waveguides. In still other aspects of the present invention, the first and second multiplexers are birefringent wavelength selective couplers, such as a birefringent arrayed waveguide grating for example. In another aspect of the present invention each of the plurality of signal channels includes a light source and a modulator. The light source may be a DBR or a DFB laser for example. The modulator may include a Mach-Zehnder interferometer for example. In still other aspects of the present invention, the optical circuit may include a polarization beam combiner which is configured to received the first and second multiplexed outputs and combined them into a combined polarization output signal provided at an output of the polarization beam combiner, the first multiplexed output having a first polarization state and the second multiplexed output having a second polarization state, the second polarization state being different from the first polarization state. According to other aspects of the invention, the optical circuit may include one or more polarization rotators which may act to rotate one or more optical signals such that the second polarization state of the second multiplexed output is different than the first polarization state of the first multiplexed output. The first and second polarization states may be a TM polarization state, a TE polarization state, or another polarization state.

It is to be understood that both the foregoing general description and the following detailed description are exemplary and explanatory only and are not restrictive of the invention, as claimed. Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. In the drawings wherein like reference symbols refer to like parts.

DETAILED DESCRIPTION OF THE INVENTION

The present invention provides a system, apparatus and method to maintain the polarization state of an optical signal propagating through an optical circuit, such as a photonic integrated circuit. Birefringent waveguide structures may be used to maintain the polarization state of the optical signal as it propagates from an optical source, and then through one or more optical elements, both passive and active, as part of the optical circuit. A birefringent wavelength selective coupler, such as a birefringent arrayed waveguide grating or a birefringent Echelle grating, may be used to maintain the polarization of multiple optical signals. For example, the birefringent wavelength selective coupler may combine the multiple optical signals into a signal multiplexed signal, such as a wavelength division multiplexed (WDM) signal. Polarization strippers may be utilized to maintain the polarization state of the output WDM signal. Alignment lasers may be utilized to maintain the polarization state of the output WDM signal at an interface point between a facet of a first photonic integrated circuit and a facet of a second photonic integrated circuit, each of the first and second photonic integrated circuits being part of the optical circuit. Additionally, the alignment lasers may be utilized to maintain the polarization state of the output WDM signal at an interface point between the facet of the first photonic integrated circuit and a polarization-maintaining fiber.

The following description is set forth for purpose of explanation in order to provide an understanding of the invention. However, it is apparent that one skilled in the art will recognize that embodiments of the present invention, some of which are described below, may be incorporated into a number of different systems and devices.

The embodiments of the present invention may include certain aspects each of which may be present in hardware, software or firmware. Structures and devices shown below in block diagram are illustrative of exemplary embodiments of the invention and are meant to avoid obscuring the invention. Furthermore, connections between components within the figures are not intended to be limited to direct connections. Rather, signals, whether optical or electrical, between these components may be modified, re-formatted or otherwise changed by intermediary components.

Reference will now be made in detail to the present exemplary embodiments, which are illustrated in the accompanying drawings.

Figure 1A:
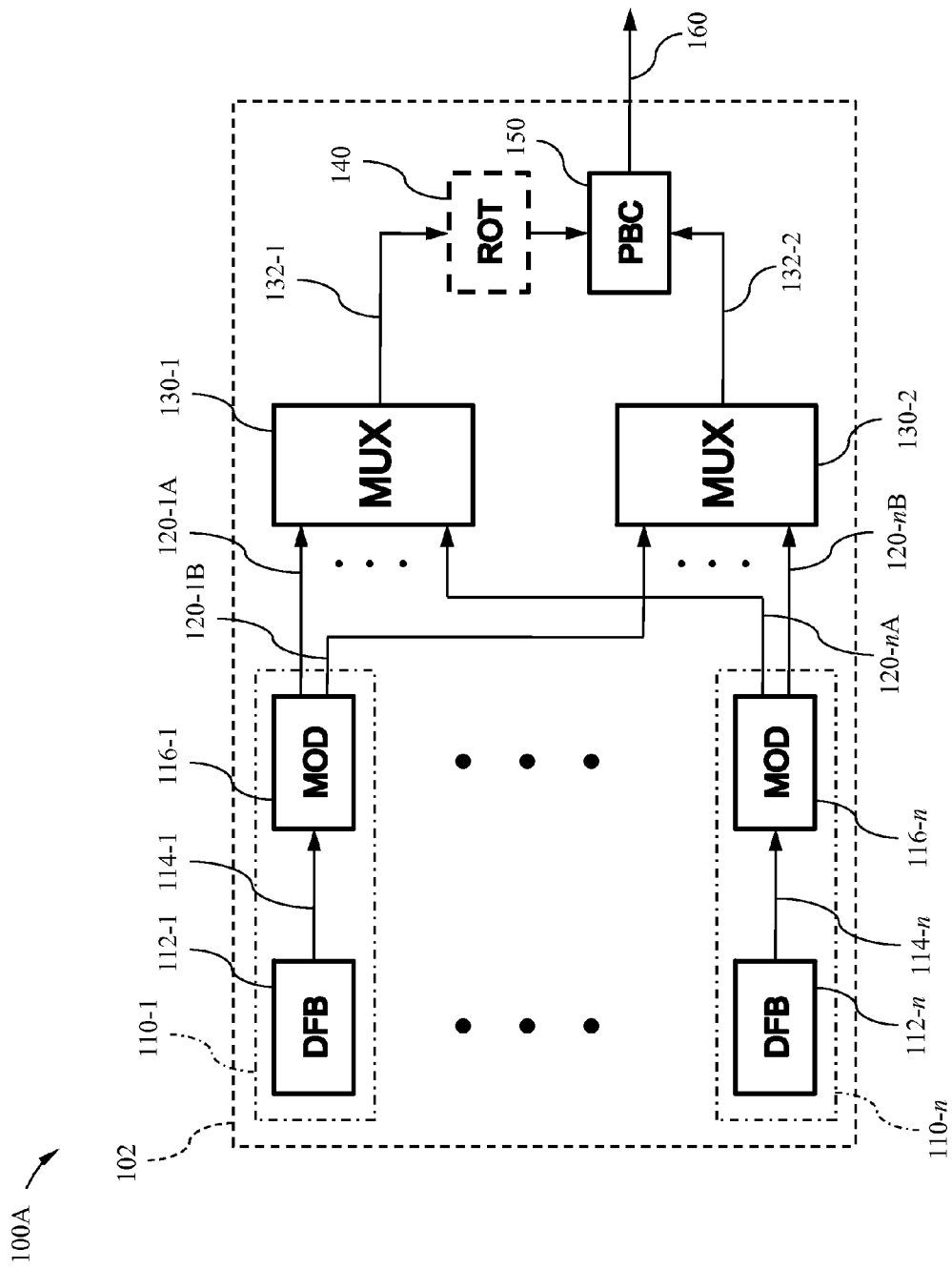
FIG. 1A is a block diagram of a first embodiment, consistent with various aspects of the present disclosure.

Turning to FIG. 1A, a first embodiment consistent with the present disclosure includes a number n of signal channels 110, first and second multiplexers 130, an optional polarization rotator 140 (in dashed line) and a polarization beam combiner or multiplexer 150, provided on a substrate 102. With specific reference to signal channel 1, e.g. 110-1, each of the signal channels 110-1 through 110-n, collectively referred to herein as signal channels 110, includes a light source 112-1 and a modulator 116-1. The light source 112-1 may be any suitable light source, for example a distributed feedback (DFB) laser or a distributed Bragg reflector (DBR) laser. The light source 112-1 is preferably fabricated with an active region including strained layers providing preferentially high gain to a polarization state, for example a transverse electric (TE) polarization state or a transverse magnetic (TM) polarization state. For example, for a light source fabricated in a InP material system, compressively-strained quantum wells or active regions may produce TE-polarized light.

Light from the light source 112-1 is provided to a modulator 116-1 via a waveguide 114-1. The modulator 116-1 is configured to accept the light from the light source 112-1 and provide first and second modulated outputs, each output having a polarization state. The polarization state may be the same for each of the first and second modulated outputs or may be different, as discussed below. Exemplary modulators 116 are further described in U.S. patent application Ser. No. 11/646,942, incorporated herein by reference in its entirety. The first modulated output of the modulator 116-1 is provided to an input of a first multiplexer 130-1 and the second modulated output of the modulator 116-1 is provided to an input of a second multiplexer 130-2. Each of the first and second multiplexers 130 may be wavelength multiplexers and, preferably, birefringent wavelength multiplexers in order to maintain the polarization state of the received modulated output signals, e.g. modulated outputs 120-1A, 120-1B, as the received modulated signals propagate through the multiplexers 130.

The first multiplexer 130-1 combines the received modulated output signals 120-nA from each of the modulators 116 of each signal channel 110, and combines the signals 120-nA into a multiplexed signal, for example a WDM signal. Similarly, the second multiplexer 130-2 receives each of the modulated outputs 120-nB from each of the modulators 116 of each signal channel 110, and combines the signals 120nB into a multiplexed signal, for example a WDM signal. The multiplexed output of the first multiplexer 130-1 is provided to a first input of the polarization beam splitter 150 and the multiplexed output of the second multiplexer 130-1 is provided to a second input of the polarization beam splitter 150. The polarization beam splitter 150 then combines the first and second multiplexed outputs from the first and second multiplexer 130, respectively, into a polarization multiplexed output signal 160. If each of the modulated outputs 120-nA, 120-nB are of the same polarization state, e.g. a TE polarization state, then the multiplexed signal from one of the multiplexers 130, for example the first multiplexer 130-1 as depicted, may be rotated in the optional polarization rotator 140.

As shown with respect to the optical circuit 100A of FIG. 1A, each signal channel 110 provides for two modulated outputs, for example first modulated outputs 120-nA and second modulated outputs 120-nB. While shown as being provided on the substrate 102, the signal channels 110, or the various elements of the signal channels 110, may be provided on one or more additional substrates (not shown). Each of the light sources 112 may provide light of the same polarization state. Alternatively, a first group of light sources 112 may provide light of a first polarization state, while a second group of light sources 112 may provide light of a second polarization state. In any case, the modulated outputs provided to the first multiplexer 130-1 on corresponding waveguides 120-nA are of the same polarization, and the modulated outputs provided to the second multiplexer 130-2 on corresponding waveguides 120-nB are of the same polarization.

It should be noted that the optional rotator 140 would not be needed if one of the two modulated outputs of each signal channel 110 was rotated via a corresponding polarization rotator (not shown) prior to being provided to a multiplexer 130. For example, given that each of the light sources 112-1 provides light having a TE polarization state, each of the modulated outputs provided on waveguides 120-nB may be rotated to have a TM polarization state prior to being provided to multiplexer 130-2. Thus, each modulated output signal as part of the multiplexed output signal of multiplexer 130-1 would have a TE polarization state, and each modulated output signal as part of the multiplexed output signal of multiplexer 130-2 would have a TM polarization state. The polarization beam combiner 150 would then combine the first and second multiplexed outputs received via waveguide 132-1 and waveguide 132-2, respectively, to provide the polarization multiplexed output signal 160. It is also understood that the TE polarization state or mode and TM polarization state are used in an exemplary fashion. Other polarization states, therefore, may be utilized, such polarization states being maintained consistent with the present disclosure.

The primary output of each WDM multiplexer may pass through other optical elements and will finally connect to the polarization multiplexer. The polarization multiplexer may be part of the PIC chip, or might be off-chip. In either case, polarization states must be maintained up to the input of the polarization multiplexer.

Figure 1B:
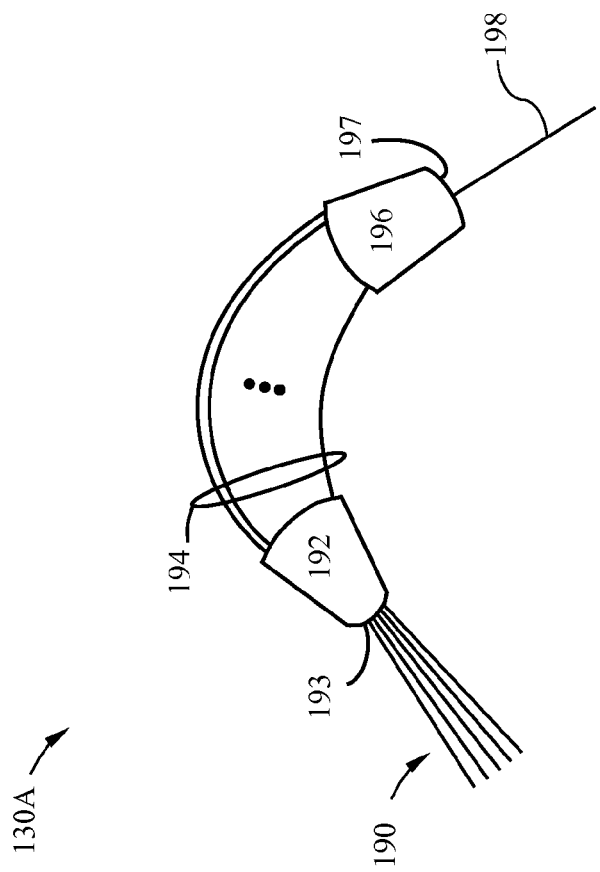
FIG. 1B is a schematic view of an exemplary mulitplexer, consistent with various aspects of the present disclosure.
Figure 1C:
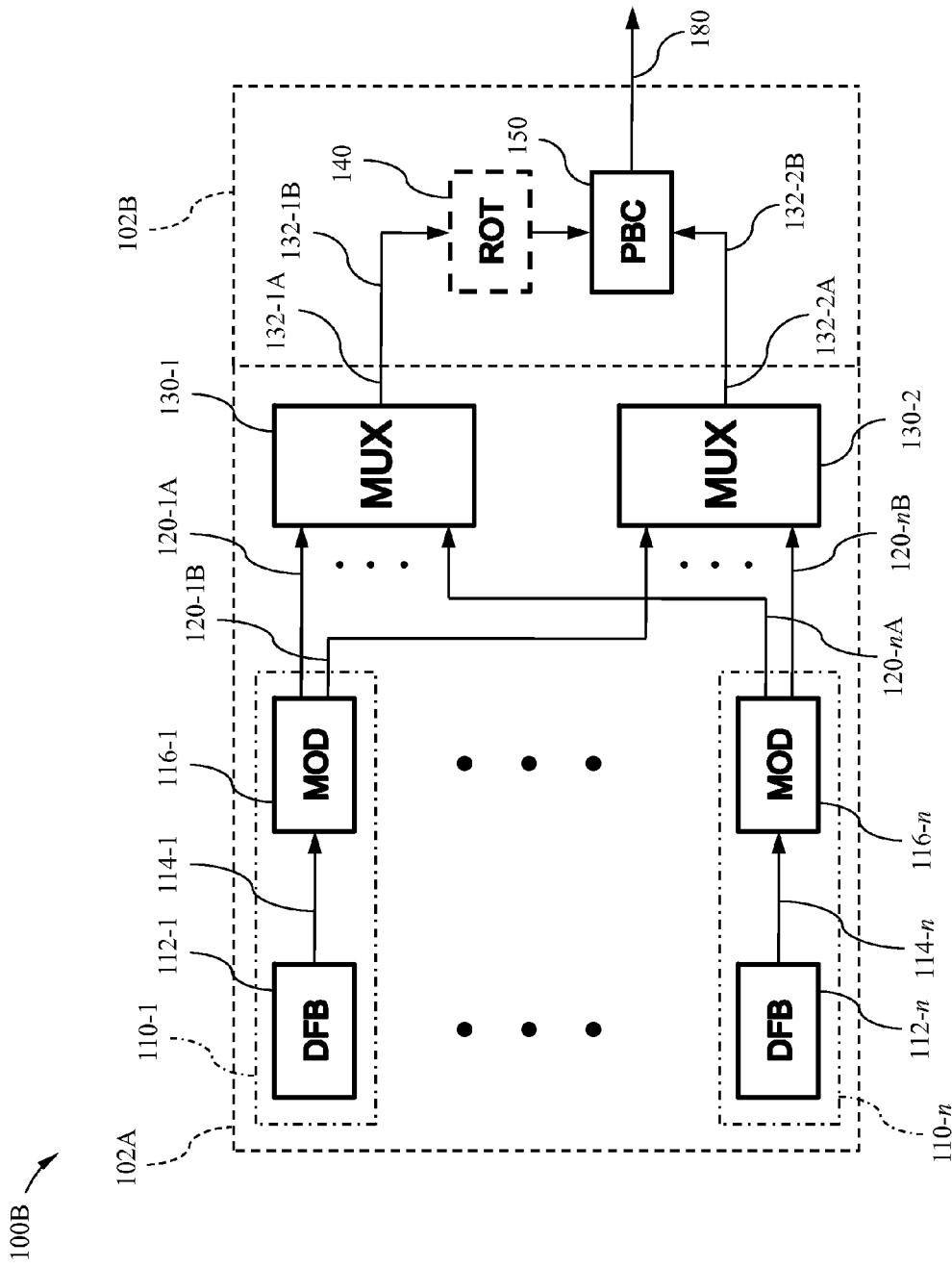
FIG. 1C is a block diagram of a second embodiment, consistent with various aspects of the present disclosure.

As stated above, each of the multiplexers 130 may include a birefringent wavelength multiplexer. Turning to FIG. 1B, an exemplary birefringent wavelength multiplexer 130A is depicted. A number of optical signals may be received on a number of input waveguides 190 and provided to a first end 193 of an input slab 192. Each of the optical signals may include one or a number of different polarizations, for example a TM polarization or a TE polarization. The received optical signals are directed through a plurality of arms 194, each having a different length, prior to being provided to a second slab 196. The multiplexer 130A is configured to multiplex the received optical signals of a given polarization, e.g. the same polarization such as a TM polarization or a TE polarization, into an output multiplexed signal provided on an output waveguide 198. For illustration purposes only, if a signal received at the input of the birefringent wavelength multiplexer 130A includes a component in an unwanted polarization state, that component of the signal will be output to a different location, along a end surface 197 of the output slab 197 for example. The birefringent wavelength multiplexer 130A therefore maintains the polarization state of the signals, e.g. received modulated signals from waveguides 120-nA, 120nB, as such signals propagate through the multiplexer. Arrayed waveguide gratings can be made birefringent by design, and have been used as a polarization splitter, as disclosed for example in U.S. Pat. No. 7,149,373.

Now turning to FIG. 1B, a second optical circuit 100B, similar to optical circuit 100A, includes the n signal channels and first and second multiplexers 130 provided on a first substrate 102A, while the optical rotator 140 and the polarization beam combiner 150 are provided on a second substrate 102B. The multiplexed output signals from the multiplexers 130 are provided on a first waveguides 132-1A, 132-2A along the first substrate 102A, and second waveguides 132-1B, 132-2B, respectively, along the second substrate 102B. The two substrates 102A, 102B may be butt-jointed as shown, or may be spaced from each other. In the case where the substrates 102A, 102B are spaced from each other, the multiplexed output signals propagating on waveguides 132-1A, 132-2A would be interfaced or coupled to corresponding waveguides 132-1B, 132-2B via a pair of fiber optical cables, preferably polarization maintaining fiber optical cables as are know in the art. The waveguides 132-1A, 132-2A are short in length and provide little to no bends prior to reaching an edge of the substrate 102A, as shown in dashed line. While depicted to reach the edge of the substrate 102A generally perpendicular to the edge, the waveguides 132-1A, 132-2A may interface with the edge of the substrate 102A at an angle to mitigate reflections. The output of the multiplexers 130, for example, may be close to and oriented toward the edge of the substrate 102A. Moreover, the orientation of the multiplexers 130 is configured in such a way as to minimize propagation distance and a number of bends from the output of each of the multiplexer 130 to the input of the polarization beam combiner or multiplexer 150. Therefore, changes to the polarization state of the modulated output signals of the multiplexers 130 may be mitigated, and the polarization state of the modulated output signals being preserved. It should be noted that while the representations of the various waveguide structures of the optical circuits described herein are depicted having 90° bends, such bends are for illustrative purposes only. Preferably, bends present in the optical circuits disclosed herein would include gradual bends which help to mitigate against polarization changes as the optical signals propagate through the corresponding bends.

Figure 2:
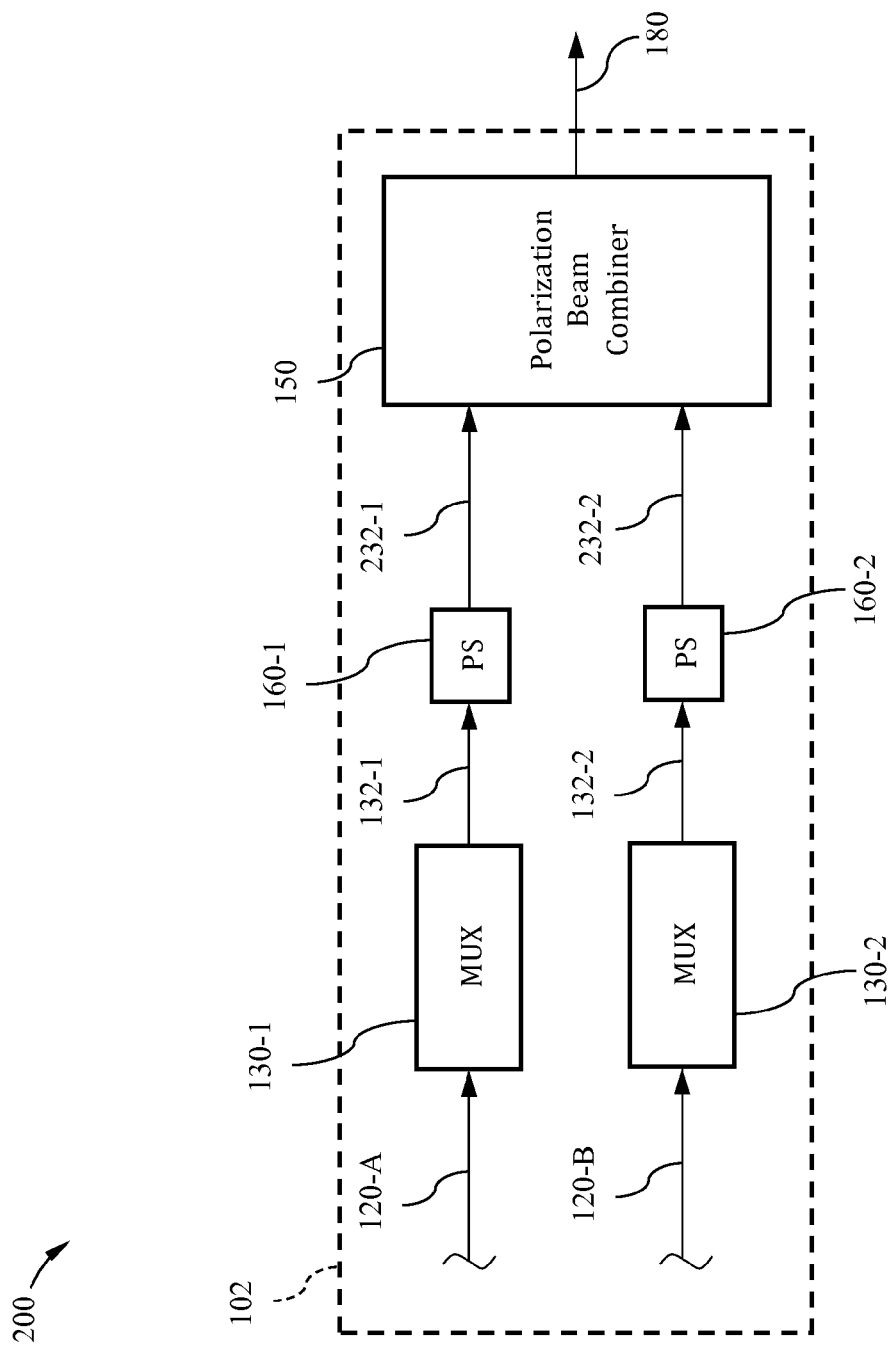
FIG. 2 is a block diagram of a third embodiment, consistent with various aspects of the present disclosure.

Turning now to FIG. 2, another embodiment consistent with various aspects of the present disclosure includes an optical circuit 200. Optical circuit 200 is similar to the optical circuit 100A of FIG. 1A, however includes a pair of polarization strippers 160. A first polarization stripper 160-1 accepts the multiplexed output signal from the first multiplexer 130-1 and a second polarization stripper 160-2 accepts the multiplexed output signal from the second multiplexer 130-2. Each of the first and second polarization strippers 160 are configured to remove unwanted polarization states in the corresponding multiplexed output signals propagating through the strippers 160. In addition to augmenting the ability of the multiplexer to remove unwanted polarization states from the multiplexed output signals, the polarization strippers 160 also remove unwanted polarization states that may be generated as the signal propagates from the outputs of the multiplexers 130 to the polarization beam combiner 150. The polarization strippers 160 may take the form of a birefringent Mach-Zehnder beam splitter, providing an output signal corresponding to a single output of the splitter, the output signal having the desired polarization state. The output signal from the first polarization stripper 160-1 is provided to the polarization beam combiner 150 along waveguide 232-1 and the output signal from the second polarization stripper 160-2 may be provided to the polarization beam combiner 150 along waveguide 232-2. A birefringent Mach-Zehnder beam splitter is further described in commonly owned U.S. Pat. Nos. 7,035,491 and 7,356,206, both of which are incorporated herein by reference in their entirety. Another exemplary polarization stripper uses an overlay material on the top or side of a portion of a waveguide to preferentially absorb, e.g. attenuate, one of the polarization states. Metal is often used for this purpose since its absorbing properties are highly polarization dependent. Such polarization strippers are described in more detail in U.S. Pat. No. 6,891,983.

Figure 3:
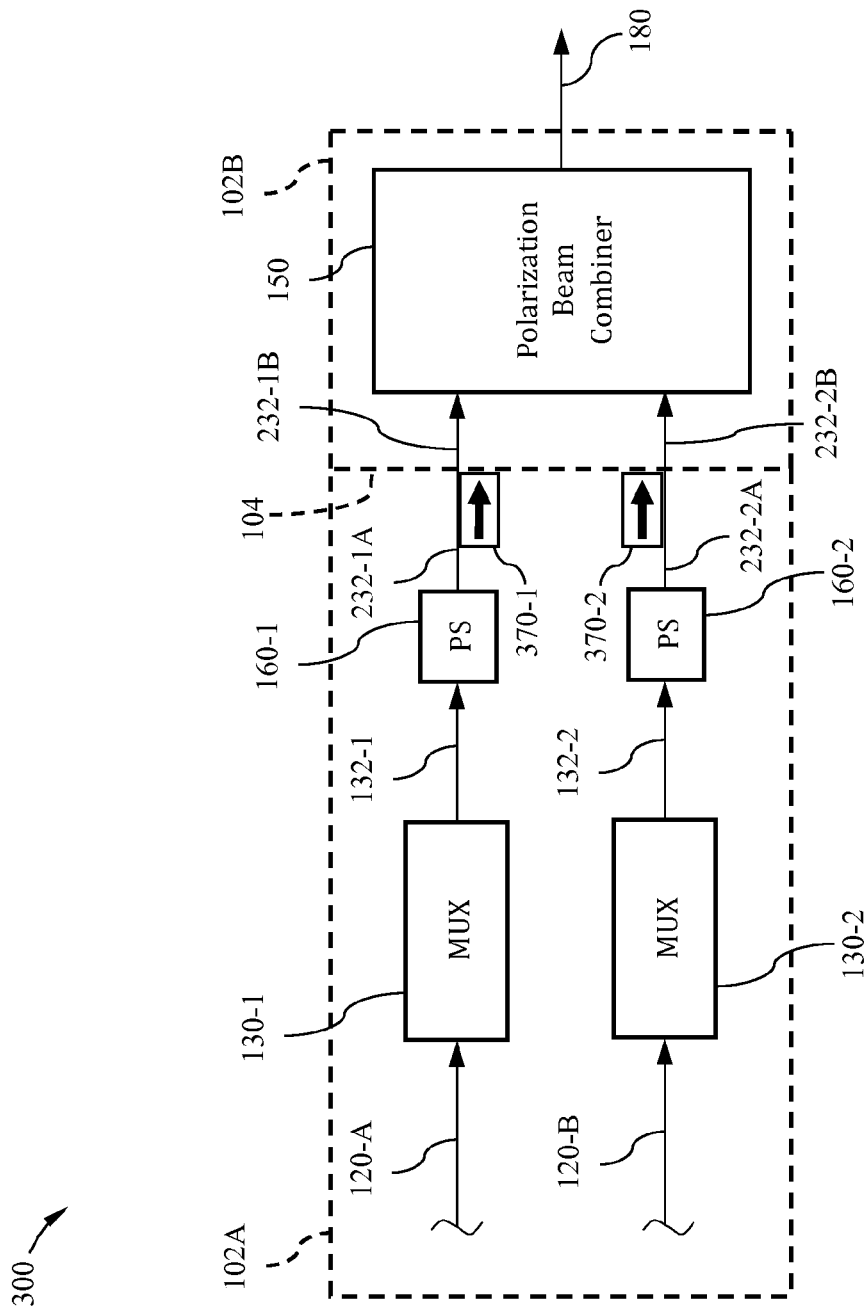
FIG. 3 is a block diagram of a fourth embodiment, consistent with various aspects of the present disclosure.

Turning to FIG. 3, an optical circuit 300 is similar to optical circuit 200, however the polarization beam combiner 150 is provided on a separate substrate, adjacent to or spaced from substrate 102A for example. As discussed above with respect to the multiplexed output signals provided on waveguides 132-1A and 132-2A of optical circuit 100B, the polarization strippers 160 are positioned close to an edge of the substrate 102A such that changes to the polarization states of the optical output signals provided by the polarization strippers 160-1, 160-2 on waveguides 232-1A, 232-2A, respectively, are mitigated.

As discussed above with respect to the optical circuit 100B of FIG. 1B, the polarization beam combiner 150 may be provided on a second substrate 102B and butt jointed to an edge of the substrate 102A. Alternatively, if the polarization multiplexer 150 is located on the substrate 102B spaced from the substrate 102A, a connection must be made from the multiplexed outputs, provided on waveguides 232-1A and 232-1B for example, to the polarization multiplexer 150. The connection may be made through one or more optical fiber cables. For example, polarization maintaining optical fiber may be used to interface the waveguides 232-1A, 232-2A with the corresponding waveguides 232-1B, 232-2B, respectively. A polarization maintaining connection provided between the waveguide structures 232 and the polarization maintaining optical fiber may each include one or more principle axes, such that optical signals whose polarization state is oriented along a principle axis will propagate in the polarization maintaining connection. As a result, the polarization state of the optical signal maybe preserved. Alternatively, if the polarization state of an optical signal is not aligned to a principle axis at the interface or connection point, e.g. where the waveguide 232-1A, 232-1B interfaces with the polarization maintaining optical fiber, the polarization state may rotate at the connection point. Accordingly, the polarization state of the optical signal at the interface between the polarization maintaining fiber optic cable and the waveguide, for example waveguide 232-1B or waveguide 232-2B, may become indeterminate.

When aligning the polarization maintaining connection to the substrate 102A chip, the principle axes, e.g. of the polarization maintaining optical fiber, is preferably be aligned with the preferred polarization orientation of the outputs, e.g. where the waveguides 232-1A, 232-2A terminate, along a facet 104 of the substrate 102A for example. Such alignment may be difficult if the power levels of the optical signals propagating through the waveguides 232-1A, 232-2A are low, or contain considerable stray light, due to on-chip scattering for example. Alignment may be further hindered if a polarization state of a first group of optical signals propagating through the waveguide 232-1A, as part of a desired output, is different or non-orthogonal to a second group of optical signals propagating through the waveguide 232-2A. In any case, misalignment of the polarization maintaining connection may occur, which may result in an undesirable change in the polarization state of the optical signals prior to the optical signals reaching the polarization multiplexer 150.

To assist with alignment when the polarization beam combiner is provided on the separate substrate 102B or spaced from the substrate 102A, optical circuit 300 may include one or more alignment light sources 370. For example, a first alignment light source 370-1 may be used to align an optical signal propagating through waveguide 232-1A with the waveguide 232-1B, or a polarization maintaining optical fiber positioned between the waveguide 232-1A and the waveguide 232-1B. Similarly, a second alignment light source 370-2 may be used to align an optical signal propagating through waveguide 232-2A with the waveguide 232-2B. Alignment light sources 370 may be any suitable light source, such as DFB or DBR light sources. Alignment light sources 370 preferably output light that is polarized along one of the two desired orthogonal orientations, for example a TE polarization orientation or a TM polarization orientation.

Figure 4A:
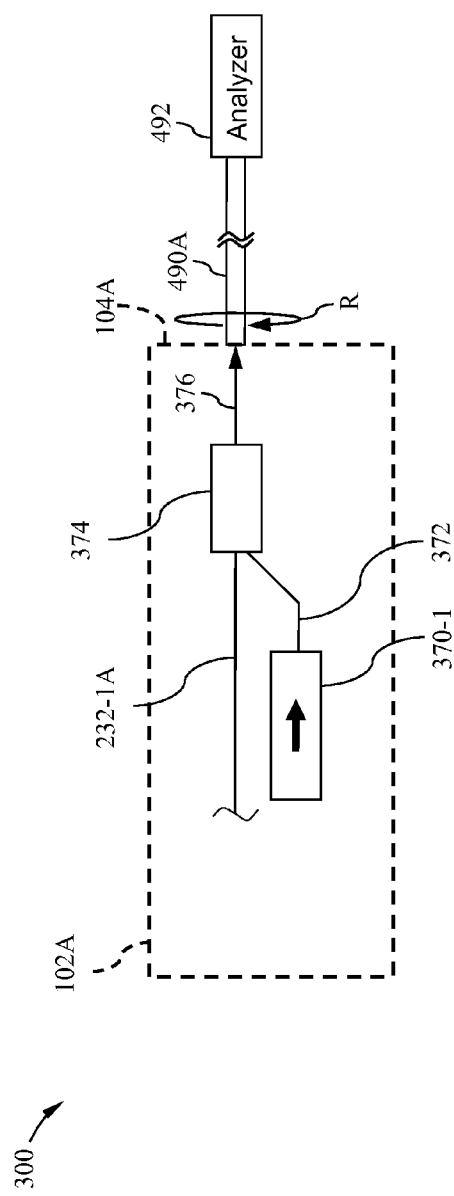
FIG. 4A is a block diagram of an exemplary configuration of the fourth embodiment of FIG. 3, consistent with various aspects of the present invention.

Turning to FIG. 4A, a more detailed view of the alignment light source 370-1 will be described. The following discussion applies equally to the alignment light source 370-2. The light from the alignment light source 370-1 may be injected directly into the optical signal propagating through the waveguide 232-1A, for example a WDM output via the optional stripper 160-1, via an optical coupler 374. The optical coupler 374 may be any suitable coupler, such as a known 3 dB optical coupler, and may interface with the light source 370-1 through a waveguide 372. The alignment light source 370-1 may be configured to output light at a sufficient amplitude or power such that the output light of the light source 370-1 is easier to distinguish light from optical noise or scattered light which may also be present. Further, the alignment light source 370-1 may be placed close to the edge of the substrate 102A and oriented in such a way as to minimize propagation length and a number and severity of bends of the waveguide 372 which could act to re-orient the light output from the source 370-1. The optical coupler 374 serves to couple the light from the alignment light source 370-1 into an output waveguide 376. To ensure that the optical signals propagating through waveguide 232-1A are not disturbed as they pass through the coupler 374, the coupler 374 may be a wavelength selective coupler. In that case, the light emitted from the alignment laser 370-1 would have a wavelength different from wavelengths used by a WDM signal propagating in waveguide 232-1A, such that the coupling of the light from the alignment laser 370-1 and the WDM signal do not destructively interfere with each other.

A first end of a polarization maintaining optical fiber 490A may be positioned adjacent to a facet 104A of the substrate 102A, such that optical energy propagating through waveguide 376 is directed into the optical fiber 490A. An optical signal analyzer 492 may be configured to receive optical energy from the polarization maintaining optical fiber 490A, from a second end of the optical fiber 490A for example. The first end of the polarization maintaining optical fiber 490A may be positioned such that the optical signal energy as received by the analyzer 492 is maximized. The polarization maintaining optical fiber 490A is then rotated about the centerline of the first end of the optical fiber 490A, as indicated by arrow R in FIG. 4A, until a principle axis of the polarization maintaining optical fiber 490A is aligned with a polarization mode of an optical output signal of the alignment light source 370-1, as indicated by the optical signal analyzer 492.

Figure 4B:
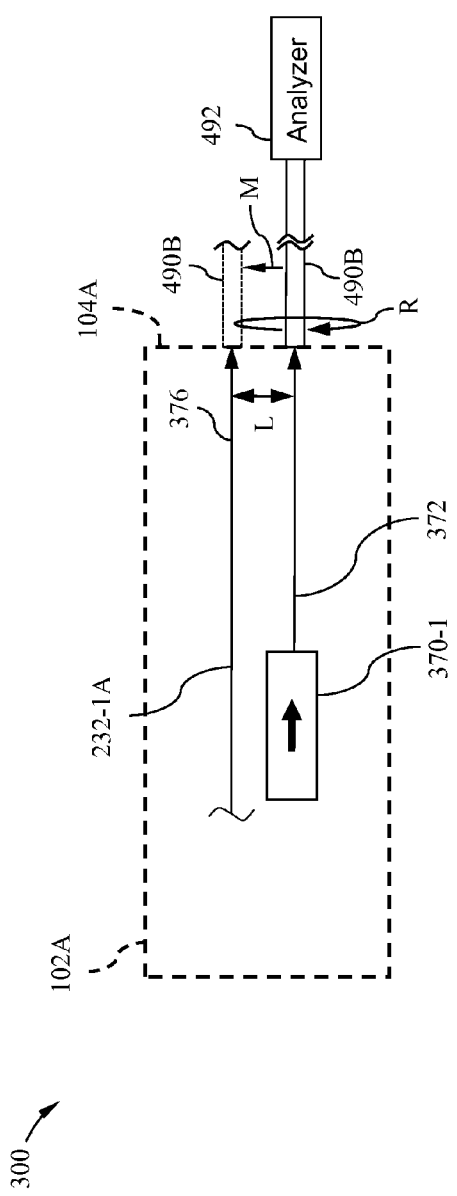
FIG. 4B is a block diagram of another exemplary configuration of the fourth embodiment of FIG. 3, consistent with various aspects of the present disclosure.

Alternatively, as depicted in FIG. 4B, the waveguide 372 may be configured to interface with a facet 104B of the substrate 102A to allow the light from the alignment laser 370-1 to exit the substrate 102A spatially separated a distance L from a WDM signal propagating waveguide 232-1A. In this configuration, the waveguide 372 carrying the light from the alignment laser 370-1 does not couple or combine with optical signals of the WDM signal. The polarization maintaining connection, e.g. a first end of a polarization maintaining fiber optic cable 490B, is established by first aligning the first end of the polarization maintaining fiber optical cable 490B with respect to a polarization of the light output from the alignment light source 370-1. The first end of the polarization maintaining optical fiber 490B is positioned adjacent the facet 104B of the substrate 102A, a centerline of the waveguide 372 aligned with a centerline of the first distal end of the polarization maintaining optical fiber 490B for example. Alignment of the centerline of the waveguide 372 with the centerline of the optical fiber 490 is for illustration purposes only. The optical signal analyzer 492 may be configured to receive optical energy from the polarization maintaining optical fiber 490B, from a second end of the optical fiber 490B for example. The first end of the polarization maintaining optical fiber 490B can then be positioned such that the optical signal energy as received by the analyzer 492 is maximized. The polarization maintaining optical fiber 490B is then rotated about the centerline of the first end of the optical fiber 490B, as indicated by arrow R in FIG. 4B, until a principle axis of the polarization maintaining optical fiber 490B is aligned with a polarization mode of an optical output signal of the alignment light source 370-1. The first end of the polarization maintaining optical fiber 490 is then moved, as indicated by arrow M, such that the centerline of the polarization maintaining optical fiber 490B is aligned with a centerline of the waveguide 376, while maintaining the rotational orientation of the first end of the polarization maintaining optical fiber 409B with the facet 104B of the substrate 102A and an end of the waveguide 376, e.g. where the waveguide 376 interfaces with the facet 104B of the substrate 102A. This second position of the polarization maintaining optical fiber 409B being shown in dashed line for clarity purposes.

Figure 5:
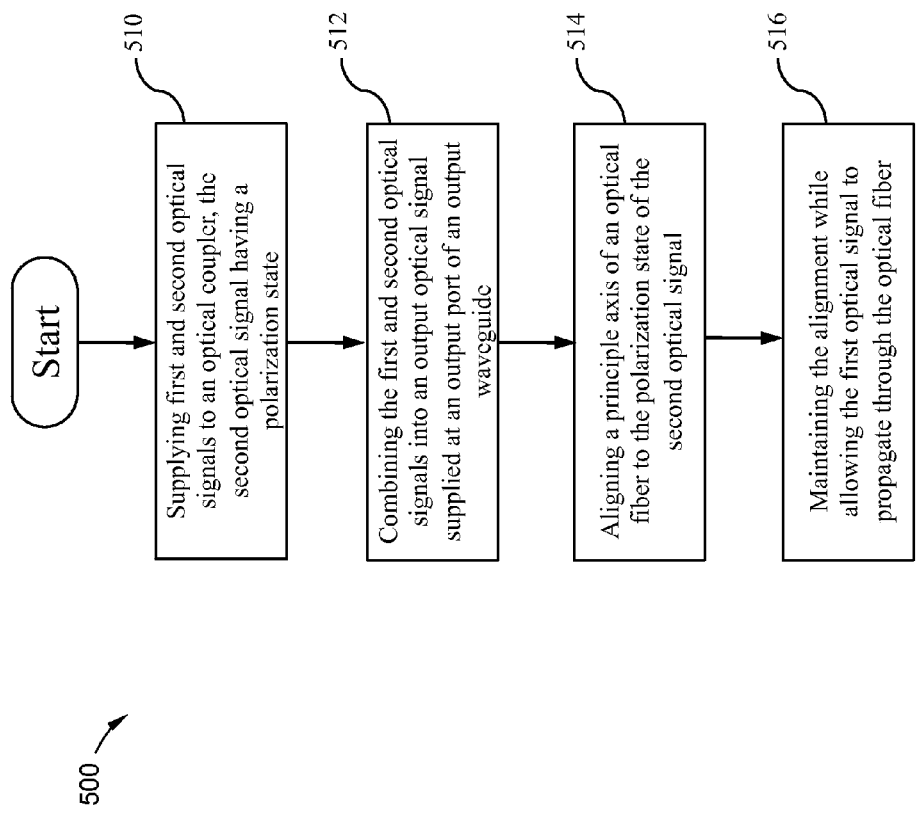
FIG. 5 is a block diagram of a method for providing a polarization maintaining connection, consistent with various aspects of the present disclosure.

Turning now to FIG. 5, a method 500 for providing a polarization maintaining connection, consistent with various aspects of the invention, will be described. First and second optical signals are supplied to an optical coupler in a step 510, the second optical signal having a polarization state, e.g. a TM polarization state or a TE polarization state. The first optical signal may be a first of a plurality of first optical signals, as part of a WDM signal for example, each of the plurality of first optical signals having substantially the same polarization state. The optical coupler may be a 3 dB coupler or a wavelength selective coupler. The first and second optical signals are combined into an output optical signal supplied at an output port of an output waveguide in a step 512. The output port may be located along a facet of a substrate for example. A principle axis of an optical fiber is aligned to the polarization state of the second optical signal in a step 514. The alignment of the principle axis of the optical fiber to the polarization state of the second optical signal is maintained in a step 516 while the first optical signal propagates through the optical fiber.

Figure 6:
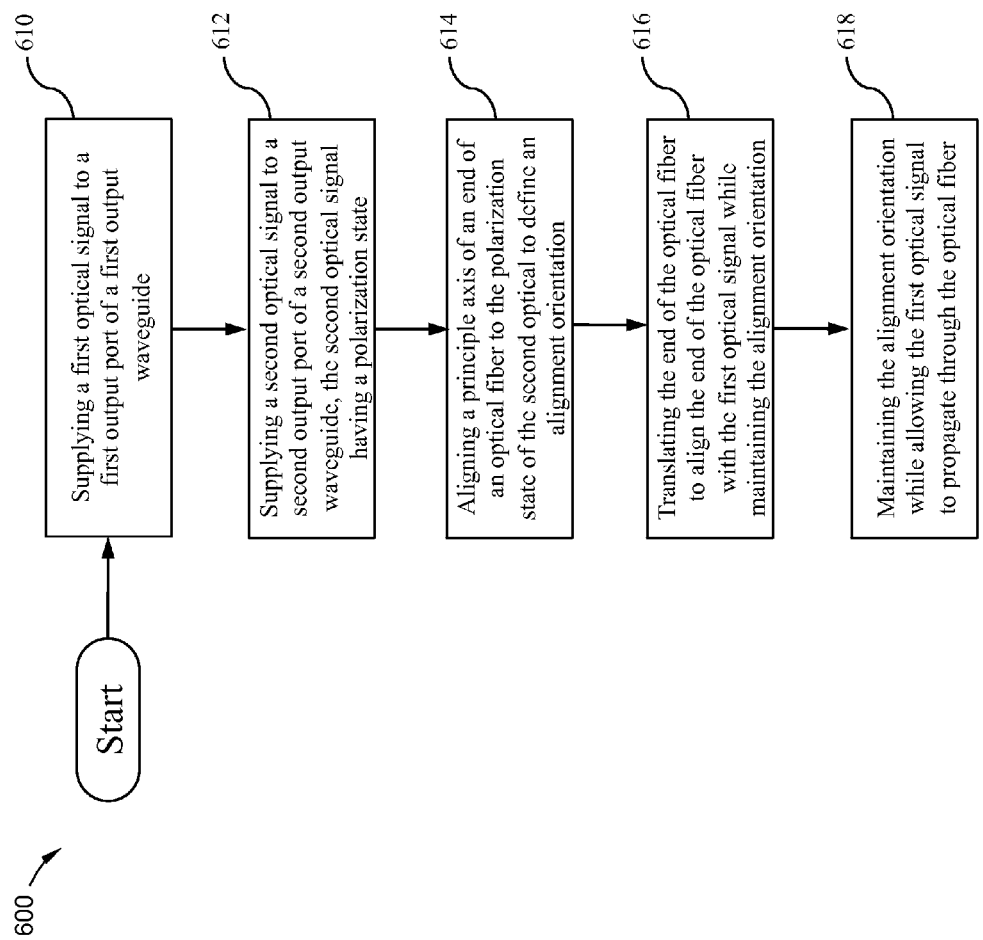
FIG. 6 is a block diagram of another method for providing a polarization maintaining connection, consistent with various aspects of the present disclosure.

Turning to FIG. 6, another method for providing a polarization maintaining connection, consistent with various aspects of the present invention, is depicted. A first optical signal is supplied to a first output port of a first output waveguide in a step 610. The first optical signal may be a first of a plurality of first optical signals, the plurality of first optical signals forming a WDM signal for example. A second optical signal is supplied to a second output port of a second output waveguide in a step 612, the second optical signal having a polarization state. The polarization state may be a TM polarization state or a TE polarization state for example, or another polarization state. A principle axis of an end of an optical fiber is aligned to the polarization state of the second optical signal in a step 614, to define an alignment orientation. The end of the optical fiber is translated to align the end of the optical fiber with the first optical signal while maintaining the alignment orientation in a step 616. The alignment orientation is maintained in a step 618 while the first optical signal propagates through the optical fiber.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An optical circuit, comprising:
   a substrate;
   an optical coupler provided on the substrate, the optical coupler having first and second inputs and an output, the first input configured to receive a first optical signal and the second input configured to receive a second optical signal, the second optical signal including a polarization state, the optical coupler combining the first and second optical signals into an optical output signal provided on the output of the optical coupler; and
   an optical fiber having first and second ends and a principle axis, the first end of the optical fiber configured to align with the optical output signal, such that the principle axis of the optical fiber is aligned with the polarization state of the second optical signal,
   wherein the optical coupler is a wavelength selective combiner, and
   wherein the first optical signal is a first of a plurality of first optical signals, each including one of a plurality of first wavelengths, and the second optical signal includes a second wavelength, the second wavelength being different than each of the plurality of first wavelengths.

2. The optical circuit of claim 1, wherein the optical coupler is a 3 dB optical coupler.

3. The optical circuit of claim 1, wherein the plurality of first optical signals form a WDM signal.

4. The optical circuit of claims 1, wherein the polarization state is a TM polarization state or a TE polarization state.

5. The optical circuit of claim 1, further comprising a waveguide provided on the substrate, the waveguide having first and second ends, the first end of the waveguide coupled to receive the optical output signal from the optical coupler, and the second end of the waveguide coupled to an output port, the optical fiber configured to interface with the output port.

6. The optical circuit of claim 1, further comprising a multiplexer provided on the substrate, the multiplexer having a plurality of inputs and an output, each of the plurality of inputs configured to receive a corresponding one of a plurality of optical signals, the multiplexer configured to combine the plurality of optical signals into a multiplexed output signal, the first optical signal including the multiplexed output signal.

7. The optical circuit of claim 6, further comprising a plurality of signal channels provided on the substrate, each providing a corresponding one of a plurality of first modulated outputs and a corresponding one of a plurality of second modulated outputs, each of the plurality of inputs of the multiplexer configured to receive a corresponding one of the plurality of first modulated outputs.

8. The optical circuit of claim 7, wherein the multiplexer is a birefringent wavelength multiplexer.

9. The optical circuit of claim 8, wherein the birefringent wavelength multiplexer is a birefringent arrayed waveguide grating.

10. The optical circuit of claim 7, wherein the multiplexer is a first multiplexer and the multiplexed output is a first multiplexed output, the optical circuit further comprising a second multiplexer having a plurality of inputs and an output, each of the plurality of inputs of the second multiplexer configured to receive a corresponding one of a plurality of second modulated outputs, the second multiplexer combining the plurality of second modulated outputs into a second multiplexed output.

11. The optical circuit of claim 10, wherein the optical coupler is a first optical coupler and the optical fiber is a first optical fiber, the optical circuit further including a second optical coupler provided on the substrate and a second optical fiber, the second optical coupler having two inputs and an output, the first input configured to receive a third optical signal and the second input configured to receive a fourth optical signal, the third optical signal being the second multiplexed output from the second multiplexer, the fourth optical signal having a polarization state, the second optical coupler combining the third and fourth optical signals into an optical output signal provided on the output of the second optical coupler, the second optical fiber having first and second ends and a principle axis, the first end of the second optical fiber configured to align with the optical output signal of the second optical coupler, such that the principle axis of the second optical fiber is aligned with the polarization state of the fourth optical signal.

12. The optical circuit of claim 11, wherein the polarization states of the second and fourth optical signals are the same.

13. The optical circuit of claim 11, wherein the polarization states of the second and fourth optical signals are different.

14. The optical circuit of claim 11, wherein the polarization states of the second and fourth optical signals is a TM polarization state or a TE polarization state.

15. The optical circuit of claim 7, wherein each of the plurality of signal channels includes a light source coupled to a modulator.

16. The optical circuit of claim 15, wherein the light source is a DFB laser or a DBR laser.

17. The optical circuit of claim 15, wherein the modulator includes a Mach-Zehnder interferometer.

18. The optical circuit of claim 15, wherein the modulator includes an input and first and second outputs, the input configured to receive light from the light source and modulate the light to provide a first modulated output on the first output and a second modulated output on the second output.

19. A method for providing a polarization maintaining connection, comprising the steps:
supplying a first optical signal to a first input of an optical coupler;
supplying a second optical signal to a second input of the optical coupler, the second optical signal having a polarization state;
combining the first and second optical signals into an optical output signal provided at an output of the optical coupler;
supplying the optical output signal on an output port of an output waveguide;
aligning a principle axis of an optical fiber to the polarization state of the second optical signal; and
maintaining the alignment of the principle axis of the optical fiber to the polarization state of the second optical signal while allowing the first optical signal to propagate through the optical fiber,
wherein the optical coupler is a wavelength selective combiner,
wherein the first optical signal is a first of a plurality of first optical signals, each including one of a plurality of first wavelengths, and the second optical signal includes a second wavelength, the second wavelength being different than each of the plurality of wavelengths.

20. The method of claim 19, wherein the optical coupler is a 3 dB optical coupler.

21. The method of claim 19, wherein the plurality of first optical signals form a WDM signal.

22. The method of claim 19, wherein the polarization state is a TM polarization state or a TE polarization state.

23. The method of claim 19, wherein the output port is located along a facet of a substrate.

* * * * *